Oct. 28, 1952 — C. A. KARG — 2,615,178

SEAT OR MATTRESS SUPPORT

Filed Feb. 26, 1949

Inventor
CHARLES A. KARG

By
*C. W. Waters*

ATTORNEY

Patented Oct. 28, 1952

2,615,178

UNITED STATES PATENT OFFICE 2,615,178

SEAT OR MATTRESS SUPPORT

Charles A. Karg, Cuyahoga Falls, Ohio, assignor to Wingfoot Corporation, Akron, Ohio, a corporation of Delaware Application February 26, 1949, Serial No. 78,541

6 Claims. (Cl. 5—210)

This invention relates to supports adapted for use as a seat or mattress support, and especially to supports that are well suited for use upon a moving vehicle such as a train, bus, airplane or the like, although the support also may be used with stationary members, such as a theater seat, if desired.

Heretofore various types of seat or mattress supports have been provided and many of such supports have used a load carrying sheet which is secured to a carrying frame by means of coil springs. Such coil springs stretch and weaken after use and thus loosely support the sheet in the carrier frame. Then too, the rigid support frame provides a hard, inflexible member in immediate association with the edges of the presumably yielding load carrying member. In order to overcome some of the problems attendant the use of coil springs for supporting a flexible load carrying sheet in a mattress support, the use of adjustable tensioning means in association with the springs has been suggested whereby the tension set up thereon can be controlled and variation in the springs characteristics can be controlled. In moving vehicles, vibration from the vehicle is transmitted to the load carrier and thus to the person supported thereon. Even with adjustable tension coil springs, it still is difficult to maintain uniform tension in different sections of a flexible load support sheet and it also would not eliminate the rigid edge frame which vibrates with its support and presents an uncomfortable solid edge support for the mattress or other member being carried thereby. Also, the load support characteristics of coil springs are objectionable in some instances.

The general object of the present invention is to avoid and overcome the foregoing and other difficulties of present types of mattress or seat supports and to provide a support which is characterized by the use of an adjustable tension load support member which is itself additionally supported by resilient vibration dampener means.

Another object of the invention is to prevent the transmission of vibration from a vehicle to a person being supported on the vehicle.

Another object of the invention is to use rubber means in compression for positioning a load support member.

Another object of the invention is to insulate a support frame from the means positioning same.

Another object of the invention is to provide a long lasting, sturdy load support device which will retain given desirable load support characteristics for long periods.

A further object of the invention is to provide an adjustable load support member wherein the support characteristics can easily be adjusted to take care of any normal load placed thereon and the individual desires of a person supported thereby.

Another object of the invention is to provide a relatively uncomplicated, inexpensive load support device which is adapted to have a long service life with a minimum of maintenance thereon.

The foregoing and other objects and advantages of the invention will be made more apparent as the specification proceeds.

Attention is now directed to the accompanying drawings, wherein.

Figure 1:
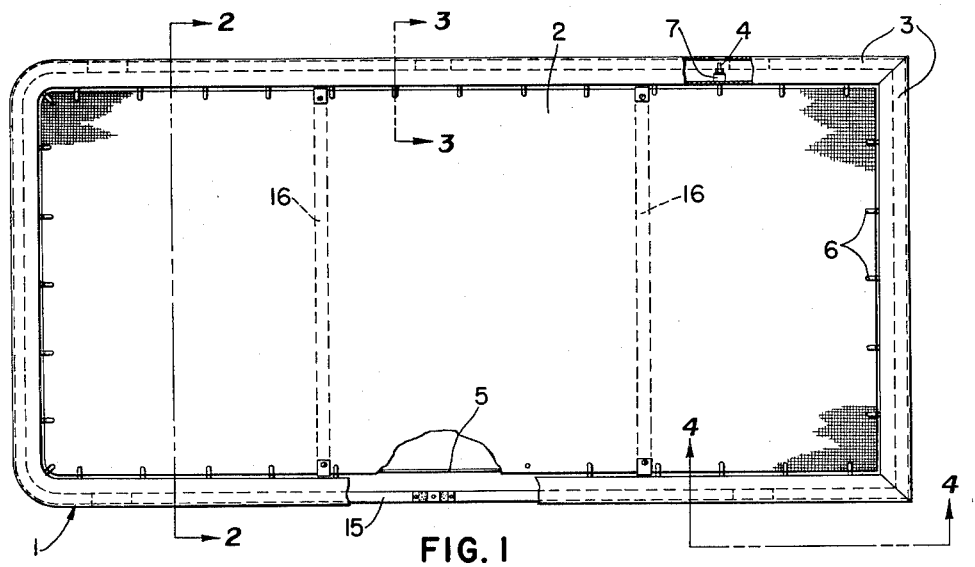
Fig. 1 is a plan, partially broken away and shown in section, of a load support device embodying the principles of the invention.

The present invention, broadly speaking, relates to a support device which includes a sheet-like support member that is provided with a plurality of tension elements extending outwardly therefrom and which are in turn secured to a frame member by rubber members that are placed under compression load by the tension elements. Such frame member is supported on a sub-frame through vibration dampening means.

The present invention will be described in detail with relation to the accompanying drawings. Corresponding numerals will be used in the accompanying specification and in the drawings to indicate corresponding parts.

Reference is now directed to the details of the construction shown in the drawings, and a support generally indicated by the numeral 1 is provided. The support 1 includes a load carrying member which usually is in the form of a flexible sheet 2 that is formed from heavy canvas or other suitable material. The sheet 2 is positioned within a substantially rectangular, open centered, rigid frame 3 by a plurality of support members which in this instance are shown as comprising hook bolts 4. The sheet 2 usually has edge reinforcing means, such as a wire 5, extending therearound and a plurality of holes are formed in the sheet 2 immediately adjacent the inner edge of the wire 5 for receipt of the ends 6 of the bolts 4. The inner ends 6 of the bolts 4, and the means to which the bolts connect provide an outwardly directed pull on the sheet 2 in order to provide tension on same to position the sheet tightly in the support 1.

Figures 3, 4:
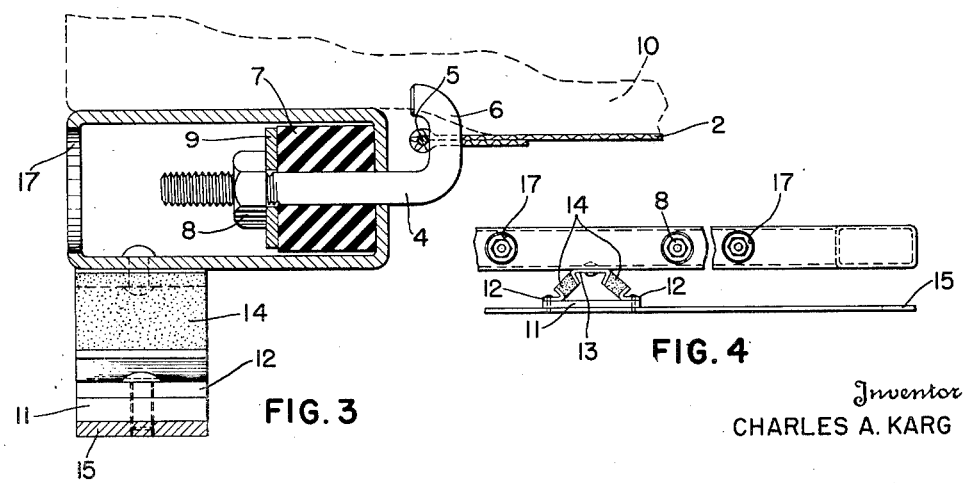
Fig. 3 is an enlarged fragmentary sectional elevation taken on line 3—3 of Fig. 1 with the position of a portion of the mattress being indicated thereon.
Fig. 4 is a fragmentary side elevation taken on line 4—4 of Fig. 1.

In order to form an adjustable, resilient but relatively stiff support means of desired characteristics for the sheet 2, the frame 3 is provided with a plurality of separate blocks 7. These blocks 7, which may be formed from natural or synthetic rubber, or rubber-like materials and which may have any desired degree of resilience and stiffness, are positioned on inner portions of the frame 3. As best shown in Fig. 3, the frame 3 is shown as made from an element that is of hollow, rectangular shape in section. Fig. 3 also shows that the bolts 4 extend through bores in the blocks 7 one edge of each of which is positioned against the inner surface of the inner wall of the frame 3. The bolts 4 transmit compressive forces to the blocks 7 by conventional nut and washer means that are associated with the outer ends of the bolts 4 and include nuts 8 and washers 9. By adjustment of the nuts 8 on the bolts 4, the tension set up in the sheet 2 can be varied and desired tensional forces can be set up thereon. Due to the connection between the sheet 2 and the frame 3, a desired resilience or flexibility is supplied to the sheet 2 to give it comfortable load support characteristics.

Figure 2:
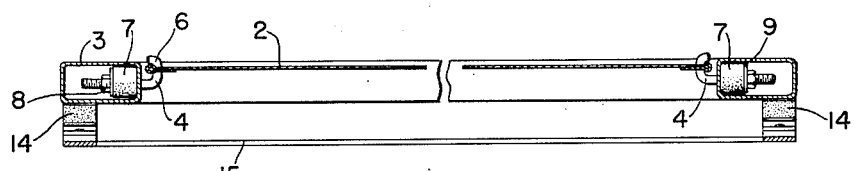
Fig. 2 is a vertical, transverse cross sectional elevation taken on line 2—2 of Fig. 1.

Fig. 2 of the drawings shows that the sheet 2 and the upper surface of the frame 3 are in substantially the same horizontal plane and that the ends 6 of the bolts do not protrude appreciably up into this plane so that any mattress or other load support article being carried by the support unit can be positioned in the general plane defined by the sheet and the upper frame surface. Fig. 3 indicates that a mattress 10 may be carried on this portion of the support 1 to aid in carrying a person in comfort on the support of the invention.

To absorb the vibration in the vehicle or other device on which the support 1 is carried and to provide a further degree of insulation between shocks and vibrations on the support vehicle or other member carrying the support 1, a plurality of vibration dampening means are provided to position the support 1. These vibration dampening means may include base plates 11, a pair of spaced lower angle supports 12 for each dampener, and upper plates 13. Load is transmitted between the lower angles 11 and the upper plate 13 of each vibration dampener by two separate rubber blocks 14 each of which is secured to and positioned between corresponding parallel surfaces provided on the angles 12 and plates 13 in any conventional manner. In all events, the blocks 14 position the upper plates 13 in a resilient manner for limited universal movement. Such movement of the upper plates 13 is, of course, retarded by the rubber blocks 14 which usually are under compressive load in the vibration dampeners and serve to absorb shocks and vibrations that are present in a sub-support member carrying the support 1. It will be realized that the vibration dampeners may be of any conventional construction and they are provided at various spaced portions of the circumference of the frame 3.

The actual support device for the support 1 of the invention comprises a sub-frame 15 which may be part of the vehicle to which the support 1 is secured, or the sub-frame may be a portion of a theatre seat or other article with which the novel support member of the invention is to be used, or the sub-frame may be the connecting member by which the support is secured to another device.

In some instances it may be desired to provide additional reinforcement for the sheet 2 and transversely extending flexible steel bands 16 are positioned below the sheet. These bands 16 usually are secured to the edge wire 5 which reinforces the sheet 2.

It will be realized that the frame 3 may be of any desired construction, but with the hollow rectangular shape of the side elements of such frame 3, it is necessary to provide access openings 17 in the outer wall of the frame in alignment with the bolts 4 whereby the nuts 8 are accessible for adjustment of the tension set up thereby on the sheet 2. Thus the compressive force set up on the blocks 7 and thus on the sheet 2, can be easily controlled. When a frame of different cross section is used, it will be seen that it may not be necessary to have openings like the opening 17.

From the foregoing, it will be apparent that a load support device is provided wherein a flexible sheet member is positioned within a support frame in a resilient and adjustable manner. As a special feature of the invention, the load support element is additionally positioned by vibration dampening means which actually transmit load from the support of the invention to the ultimate load carrying member, such as a vehicle, whereby vibrations from the vehicle are not transmitted back up to the load carrying sheet or load carrying element and additional resilience is provided in the support 1.

While certain representative embodiments and details have been shown for the purpose of illustrating the invention, it will be apparent to those skilled in this art that various changes and modifications may be made therein without departing from the spirit or scope of the invention.

Having thus described my invention, what I claim is:

1. A support for a cushion, mattress or the like, which support includes a plurality of rubber vibration dampening means having limited movement in all directions, a shallow open-centered rigid frame having substantially parallel sides held together at each end by rigid end members and supported at spaced points by said means, a flexible sheet, a wire frame around the edge of the sheet, a plurality of rubber blocks carried by said frame and retained against movement toward the center thereof, a plurality of hook bolts engaged with the wire frame in the lateral margins of said sheet and extending through said rubber blocks, and nut and washer means engaged with the outer ends of said bolts and bearing on said rubber blocks to set up a compressive force thereon and transmit load on said sheet to said frame.

2. A support for a cushion, mattress or the like, which support includes rubber vibration dampening means having limited movement in all directions, a rigid, rectangular open-centered frame supported by said means, a flexible sheet, a wire around the edge of the sheet, a plurality of rubber-like members carried by said frame and retained against movement toward the center thereof, and a plurality of bolts engaged with the wire in said sheet and extending through said rubber-like members and beyond the outer surfaces thereof, said bolts having nuts engaged with the outer portions of said rubber-like members to set up a compressive force thereon and transmit load on said sheet to said frame.

3. A mattress carrier comprising a support, a plurality of resilient rubber support means carried by spaced portions of said support, said support means stressing the rubber in shear, a substantially rectangular rigid, open-centered frame secured to and positioned by said support means, a flexible load-carrying sheet-like member, a plurality of adjustable tension members secured to the edge of said sheet-like member, and rubber means positioned in compression between said tension members and said frame.

4. A support for a mattress or the like including a flat rectangular open-centered sub-frame, a plurality of resilient rubber support means secured to the sub-frame at spaced intervals, said support means stressing the rubber support means in shear, a rectangular open-centered frame secured to and vertically positioned above said sub-frame by the support means, the entire sub-frame, frame, and support means being vertically shallow, said frame being of box-girder construction and having a plurality of holes therethrough in the plane of the frame, a load-carrying flexible sheet-like member within the boundaries of said frame but spaced therefrom, a plurality of hook bolts passing through the holes in the frame and engaging the margin of the sheet-like member, a rubber block having a hole therethrough and mounted on each bolt, each block being received within the confines of the box girder of the frame, and a nut threaded on each of said hook bolts whereby the blocks are held in compression between the frame and the nuts.

5. A support for a mattress or the like including a flat rectangular open-centered frame, a plurality of resilient rubber support means secured to the frame at spaced intervals for supporting the frame, the entire frame and support means being vertically shallow, a load-carrying flexible sheet-like member within the boundaries of the frame but spaced therefrom, a plurality of resilient means operatively connected to said frame, means connecting the sheet-like member to the resilient means to be supported therethrough on said frame by compression of the resilient means, and means for adjusting the forces exerted by the connecting means.

6. A support for a mattress or the like including a flat rectangular open-centered sub-frame, a plurality of resilient rubber support means secured to the sub-frame at spaced intervals, a rectangular open-centered frame secured to and vertically positioned above said sub-frame by the support means, the entire sub-frame, frame, and support means being vertically shallow, said frame having a plurality of holes therethrough in the plane of the frame, load-carrying flexible sheet-like member within the boundaries of said frame but spaced therefrom, a plurality of hook bolts passing through the holes in the frame and engaging the margin of the sheet-like member, a rubber block having a hole therethrough and mounted on each bolt, each block received within the frame, and a nut threaded on each of said hook bolts.

CHARLES A. KARG.

REFERENCES CITED

The following references are of record in the file of this patent:

UNITED STATES PATENTS

| Number | Name | Date |
| --- | --- | --- |
| 18,630 | Colton | Nov. 17, 1857 |
| 89,912 | Boon et al. | May 11, 1869 |
| 215,528 | Matteson | May 20, 1879 |
| 256,694 | Hull | Apr. 18, 1882 |
| 645,057 | Ayers et al. | Mar. 13, 1900 |
| 1,228,158 | Yates | May 29, 1917 |
| 1,330,512 | Billinghurst | Feb. 10, 1920 |
| 1,404,031 | Kelman | Jan. 17, 1922 |

FOREIGN PATENTS

| Number | Country | Date |
| --- | --- | --- |
| 8,816 | Great Britain | of 1894 |